United States Patent [19]

Kupper et al.

[11] 4,434,940
[45] Mar. 6, 1984

[54] INSULATED FUEL INJECTION NOZZLE DEVICE AND METHOD FOR MANUFACTURING SAME

[75] Inventors: Heinz Kupper, Troisdorf-Sieglar; Helmut Busch, Lohmar, both of Fed. Rep. of Germany

[73] Assignee: Klöckner-Humboldt-Deutz AG, Cologne, Fed. Rep. of Germany

[21] Appl. No.: 230,673

[22] Filed: Feb. 2, 1981

[30] Foreign Application Priority Data

Feb. 5, 1980 [DE] Fed. Rep. of Germany ....... 3004033

[51] Int. Cl.³ ............................................. F02M 53/04
[52] U.S. Cl. ................................. 239/397.5; 239/533.2
[58] Field of Search ...... 239/132, 397.5, 533.1–533.14

[56] References Cited

U.S. PATENT DOCUMENTS 2,231,937  2/1941  Meyer et al. ................. 239/533.3 X
4,202,500  5/1980  Keiczek ............................ 239/533.3

Primary Examiner—Andres Kashnikow
Attorney, Agent, or Firm—Watson, Cole, Grindle & Watson

[57] ABSTRACT

An insulated fuel injection device, particularly for diesel engines, is provided for maintaining the nozzle spray hole temperature at a reduced level during engine operation whereby coking at the nozzle hole is prevented. The device comprises an elongated injection nozzle having a spray hole at one end thereof and an elongated hood covering the nozzle. The hood has a spray orifice therein which is aligned with the nozzle spray hole when the device is assembled. The interior dimensions of the hood and the corresponding exterior dimensions of the nozzle are such that a generally annular gap is presented between the hood and the nozzle, at least in the vicinity of the hole, and a quantity of heat insulating material is disposed in the gap adjacent the nozzle spray hole and the hood aperature.

9 Claims, 2 Drawing Figures

INSULATED FUEL INJECTION NOZZLE DEVICE AND METHOD FOR MANUFACTURING SAME

BACKGROUND OF THE INVENTION

1. Field Of The Invention

The present invention relates to fuel injection nozzles and in particular to such an injection nozzle device and a method for making the same wherein the nozzle spray hole temperature is maintained at a reduced level during operation to prevent coking.

2. Description Of The Prior Art

It is known that the tips of injection nozzles for internal combustion engines, particularly those for direct-injection internal combustion engines, should not become hotter than approximately 220° C. when a gas or oil is employed as a fuel. When such temperature is exceeded, the spray holes often become closed due to coking of the fuel, so that the amount of fuel suppled to the combustion chamber is diminished and an orderly combustion process can thus not be achieved. In order to prevent the spray holes from being closed because of such buildup of coke, the injection nozzles have in the past been provided with water cooling. This can be accomplished in large diesel engines, but it is virtually impossible to do in vehicle engines due to their relatively small nozzle size and small combustion chambers. Also, such water cooling dictates the use of water as a general cooling agent for the internal combustion engine since the installation of a separate coolant circulating circuit solely for the injection nozzles would involve prohibitive costs.

SUMMARY OF THE INVENTION

It is, therefore, an object of the present invention to provide, with a minimum of equipment, an injection nozzle device for internal combustion engines, more particularly for those that are fitted into motor vehicles, wherein the temperature of the nozzle spray hole is maintained at a reduced level during operation so that coking is prevented. According to the invention a fuel injection nozzle device operable for maintaining the nozzle spray hole temperature at a reduced level during engine operation comprises an injection nozzle provided with a spray hole and a hood disposed in generally surrounding relationship with respect to said nozzle. The hood is provided with a spray orifice aligned with said spray hole and the interior dimensions of the hood and the corresponding exterior dimensions of the nozzle are such that a generally annular gap is presented between the hood and the nozzle, at least in the vicinity of the nozzle hole. A quantity of heat insulating material is disposed in the gap adjacent said hole and said orifice.

In the preferred form of the invention, the gap is generally uniform in width throughout its extent and the hood may be constructed of a high-alloy steel having a wall thickness in the vicinity of said spray orifice within the range of about 0.4 to about 2.0 mm. The nozzle and the hood may be provided with mating annular surfaces positioned remotely from the hole and the orifice and such surfaces may then be press fit together. In the more specific aspects of the invention the width of the gap is preferably in the range of from about 0.2 to about 1.0 mm and the orifice should be larger in diameter than said hole. Manifestly, the nozzle may be provided with a plurality of holes, there being a corresponding aligned orifice in said hood for each hole. The heat insulating material may comprise a material having a high soot content or alternatively may comprise an initially pourable material that has been hardened by precipitation and has a low heat conductivity.

In another aspect the invention provides a process for constructing such a nozzle device which comprises filling the hood with an initially pourable material capable of being hardened by precipitation and having a low heat conductivity after hardening, thereafter inserting the nozzle body and fastening the same to the hood, hardening the heat-insulating material by precipitation, and subsequently opening the spray holes and spray orifices to the desired diameter. In yet another aspect, a process for preparing such a nozzle device is provided which comprises fastening the hood to the nozzle body, providing a break-in phase for the spray nozzle during which the nozzle is used for diesel engine operation whereby the gap between the nozzle body and the hood becomes filled with sooty carbon deposits at least in the vicinity of the spray-hole, and subsequently reopening the spray holes and spray orifices to the desired diameter. The spray holes in the injection nozzle body and the spray orifices in the hood are preferably simultaneously formed after the hood has been fastened to the nozzle body.

DETAILED DESCRIPTION OF THE INVENTION

Figure 1:
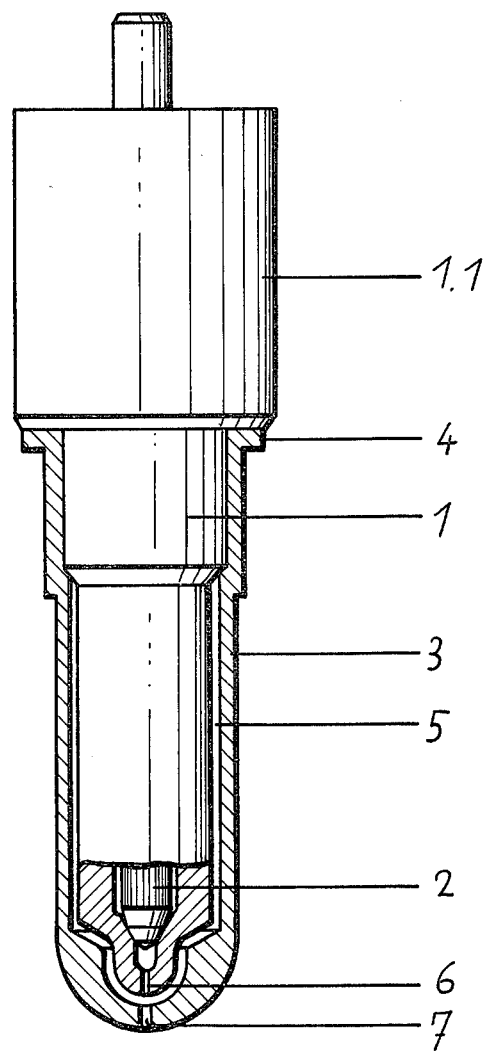
FIG. 1 is an elevational, cross-sectional view of a single hole nozzle device which embodies the principles and concepts of the present invention.

The injection nozzle shown in FIG. 1 consists of a nozzle body 1 in which a nozzle needle 2 is placed. Body 1 is enclosed, according to the invention, in a hood 3. The injection nozzle is of conventional type and therefore need not be described in detail. As is usually the case, nozzle body 1 is provided with a collet 1.1 which is affixed in conventional manner to a nozzle holder by means of a retaining nut (not shown).

Hood 3 has a collar 4 at its open end by which it engages collet 1.1 as shown. Hood 3 is so designed that in the region of its collar 4 it has an annular inner surface which encircles a corresponding outer annular surface of nozzle body 3 without a gap. In the region of its collar 4, hood 3 is press fit tightly gap. In the region of its collar 4, hood 3 is press fit tightly onto the nozzle body 1 and is also affixed to the nozzle holder with the aid of the retaining nut (not shown).

The portions of hood 3 that are spaced from collar 4 surround nozzle body 1. A gap 5 is provided which preferably has same width through its entire extent. The width of the gap may range from about 2.0 to about 1.0 mm. Nozzle 1 has a spray hole 6 and hood 3 is provided with a corresponding spray orifice 7 that is aligned with hole 6.

Figure 2:
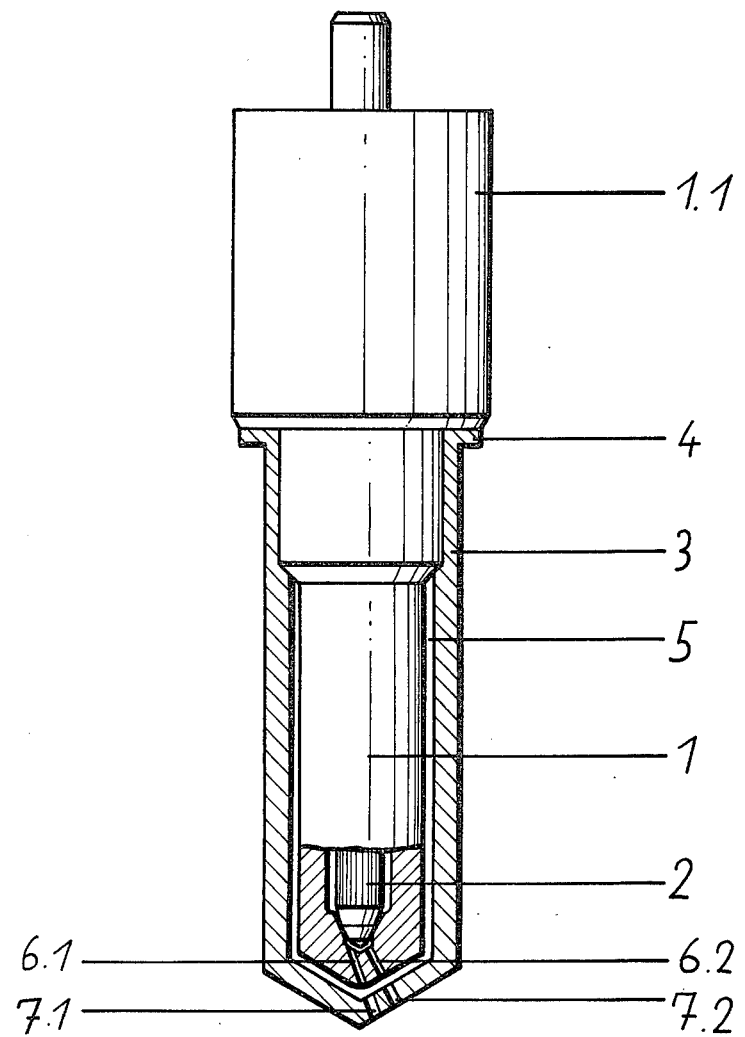
FIG. 2 is an elevational, cross-sectional view of a double hole nozzle device which embodies the principles and concepts of the present invention.

FIG. 2 illustrates a similar injection nozzle device. Unlike FIG. 1, however, injection nozzle 1 of FIG. 2 is provided with two spray holes 6.1 and 6.2. Holes 6.1 and 6.2 are angularly disposed relative to the longitudinal axis of the nozzle. Correspondingly, hood 3 also is provided with two spray orifices 7.1 and 7.2.

In order to fill the gap 5 in either case with a heat-insulating material such as soot, the following procedure may be followed:

The nozzle shown in FIG. 1 or FIG. 2 is fitted into a test engine. The engine is started and driven a few hours under operating conditions so as to ahieve temperatures which are sufficient for sooty carbon deposits to build up adjacent the spray holes. Starting out from spray hole 6, or spray holes 6.1 and 6.2, as the case may be, sooty carbon deposits build up in gap 5, filling it gradually. As the carbon depositing process proceeds, spray orifice 7, or spary orifices 7.1 and 7.2, as the case may be, also become filled with carbon. At the end of the brake-in phase, the spray orifice 7, or spray orifices 7.1 and 7.2, are nearly fully plugged. The injection nozzle device is then removed from the engine and the spray orifice 7, or spray orifices 7.1 and 7.2, are opened to their original diameters with the aid of a fine drill or other suitable means. The sooty carbon deposits in gap 5 remain intact to present a heat insulating material.

When a spray nozzle which has been treated in this manner is refitted into an internal combustion engine, it is found that the temperature of the nozzle tip in the spray-hole region, when using gas or oil as fuel and otherwise under the same operating conditions, is considerably lower than the temperature of a conventional nozzle. If, for example, the temperature of the tip of a conventional nozzle was approximately 350° C. during the normal operation of the internal combustion engine, when the nozzle device of the present invention is used and gap 5 is filled up with soot, the critical limit temperature of 220° C. at which a gas or oil spray tends to cause build-up of sooty carbon deposits, is never exceeded. This low temperature is maintained during the entire period that the novel injection nozzle is in operation.

Other tests have shown that when the injection nozzle device of the invention is used for injecting methanol into an internal combustion engine, the temperature of the nozzle tip is 80° C. rather than 180° C. as in the case with a conventional nozzle. In this way, the temperature at the spray point is maintained below the vaporization temperature of methanol. Accordingly, during operation, the spray holes and spray orifices do not become plugged because of coking.

An advantage of the invention resides in the fact that through this arrangement and when using gas or oil as fuel, the temperature of the nozzle tip is lower by more than 40° C. than when a conventional nozzle is used. Moreover, the hood 3 is a component that can easily be fabricated and since it surrounds the injection nozzle in close proximity thereto, the space the device occupies in the combustion chamber is not substantially enlarged. Moreover, modifications to the cylinder head or injection nozzle need not be made.

Advantageously, in a preferred embodiment of the invention, hood 3 is made of a high-alloy steel and has, in the spray-hole region, a wall thickness in the range of about 0.4 to about 2.0 mm. Tests have shown that hoods with greater wall thicknesses are subject to the build up of deposits on the outer surfaces thereof. And such external deposits can grow in such a way as to completely close the spray orifices.

The gap 5 preferably has a thickness in the range of from about 0.2 to about 1.0 mm. It has been found that such small gap is fully sufficient for reducing the temperature of the nozzle by more than 40° C.

In order to connect hood 3 with nozzle body 1 so as to prevent the hood from turning, it is possible to cement the hood to the nozzle body. However, it is also conceivable to press fit the hood onto the nozzle body and to provide it with a collar for reasons of security. Since the nozzle body is fastened to the nozzle holder by means of a retaining nut, the hood may be fastened over its collar using the same retaining nut. Advantageously, the spray orifices in the hood have a larger diameter than the spray holes in the nozzle body.

As an alternative embodiment, a paste with a high soot content may be inserted into the gap as the heat-insulating material. Also, an initially pourable material that hardens by precipitation may be used for the insulation.

A process for constructing a nozzle device that embodies the invention is characterized in that hood 3 is first filled with a pourable, heat-insulating paste which is capable of being hardened by precipitation. The hood is thereafter pulled down over nozzle body 1 and is attached thereto. The heat-insulating material is then, if necessary, hardened by precipitation by adding heat. And subsequently, the spray holes and/or spray orifices are opened to the desired diameter. This process is particularly suitable for integration into the fabrication process of the spray nozzles since the heat-insulated spray nozzles made according to this process need no further finishing in order to be protected during their service life.

According to another process for preparing the novel nozzle device, hood 3 is fastened to nozzle body 1, and the injection nozzle is then run through a break-in phase on a suitable test bench or in an internal combustion engine during which phase the gap is subjected to coking at least in the spray-hole region. Subsequently the spray holes and/or spray orifices are reopened to the desired diameters. This process has the advantage that no separate heat-insulating paste need be provided. The soot produced by the coking becomes engrained in the gap. Extensive tests have shown that once the gap is closed as a result of such coking, it will not reopen during the entire service life of the spray nozzle, thereby maintaining the full heat-insulating effect during the entire life period. Further tests have shown that this process is not only suitable when gas or oil is employed as fuel, but also in the case of methanol. In the latter case, a temperature reduction at the nozzle tip of up to 100° C. is achieved by means of the novel spray nozzle device constructed in accordance with the invention.

From a fabrication viewpoint, it is advantageous to form the spray holes and spray orifices simultaneously after the hood has been attached to the nozzle body. This will dispense with the need to align the spray orifice relative to the spray hole. Particularly such procedure is preferred in the case of a spray-hole axis which is angularly disposed relative to the longitudinal axis of the nozzle.

We claim:

1. A fuel injection nozzle device which is constructed such that its nozzle spray hole temperature can be maintained at a reduced level during use, said device comprising
   an injection nozzle body which includes at least one spray hole,
   a hood which is disposed in a generally surrounding relationship with respect to said injection nozzle body, said hood being constructed to provide an annular gap between it and said injection nozzle body in the vicinity of each said spray hole, said hood including a separate spray orifice extending therethrough for alignment with a respective spray hole of said injection nozzle body, and a quantity of solid heat insulating material in said annular gap adjacent each aligned spray hole and spray orifice, the solid heat insulating material providing an enclosed channel communicating between each spray hole and each spray orifice.

2. A nozzle device as set forth in claim 1 wherein said annular gap is generally uniform in width throughout its extent.

3. A nozzle device as set forth in claim 1 wherein said hood is constructed of a high-alloy steel and has a wall thickness, in the vicinity of each said spray orifice, in the range of from about 0.4 to about 2.0 mm.

4. A nozzle device as set forth in claim 1 wherein said injection nozzle and said hood are provided with mating annular surfaces remote from said spray hole(s) and said spray orifice(s), said surfaces being pressed tightly together.

5. A nozzle device as set forth in claim 2 wherein the width of said gap is in the range of from about 0.2 to about 1.0 mm.

6. A nozzle device as set forth in claim 1 wherein said each spray orifice is larger in diameter than its associated spray hole.

7. A nozzle device as set forth in claim 1 wherein said injection nozzle is provided with a plurality of said spray holes and said hood is provided with a corresponding number of aligned spray orifices.

8. A nozzle device as set forth in claim 1 wherein said solid heat insulating material comprises a material having a high soot content.

9. A nozzle device as set forth in claim 1 wherein said solid heat insulating material comprises an initially pourable material that has been hardened by precipitation and has a low heat conductivity.

* * * * *